I. A. WEAVER.
LEAF SPRING CLIP.
APPLICATION FILED MAR. 2, 1917.

1,250,257.

Patented Dec. 18, 1917.

Witnesses:

Inventor
Ira A. Weaver
By Walter M. Fuller Atty.

UNITED STATES PATENT OFFICE.

IRA A. WEAVER, OF SPRINGFIELD, ILLINOIS, ASSIGNOR TO THE WEAVER MANUFACTURING COMPANY, OF SPRINGFIELD, ILLINOIS, A CORPORATION OF ILLINOIS.

LEAF-SPRING CLIP.

1,250,257.      Specification of Letters Patent.      Patented Dec. 18, 1917.

Application filed March 2, 1917. Serial No. 151,885.

*To all whom it may concern:*

Be it known that I, IRA A. WEAVER, a citizen of the United States, residing at Springfield, in the county of Sangamon and State of Illinois, have invented certain new and useful Improvements in Leaf-Spring Clips, of which the following is a specification.

My invention concerns improvements in the clips or leaf registering devices for leaf-springs, such for example as are used in automobiles and other vehicles for the support of the body and its load. In structures of this kind it is desirable or necessary to provide some means in association with the longer leaves of such springs to prevent malalinement and displacement and also to prevent undue rebound. The present invention aims to provide a spring structure of this character which is simple in construction and economical to manufacture, and which may be readily applied without the use of any tools. By reason of its thinness, smoothness, and lack of projections, it is especially adapted for use on springs which are to be upholstered or covered, but it is also of service and convenience with unincased springs having no tendency to become loosened by reason of comprising any threaded bolts, screws, or other similar parts.

In order that those skilled in this art may have a full and complete understanding of the invention and its various advantages and the manner of attaining these desired objects above stated, I have illustrated preferred embodiments of the same in the accompanying drawing which forms a part of this specification and throughout the various views of which like reference characters refer to the same parts.

Figure 1:
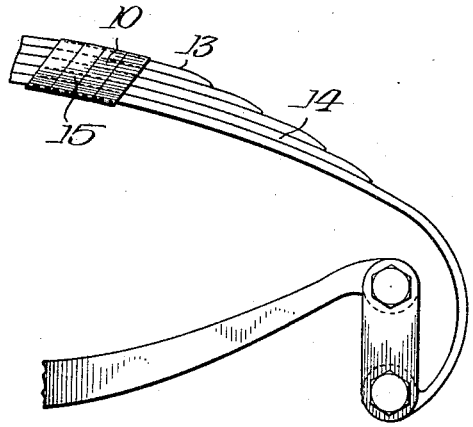
Figure 1 is a fragmentary elevation of a leaf-spring structure provided with the new form of clip.
Figure 2:
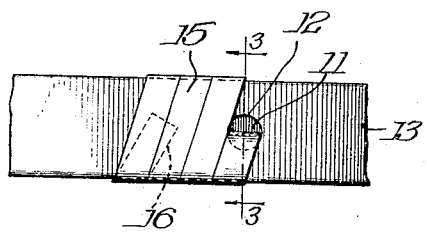
Fig. 2 is a fragmentary plan view of the device shown in Fig. 1.

The clip device proper comprises merely a thin metal ribbon 10, such as steel, copper, aluminum, or the like, which can be readily bent to shape. One end of such strip or ribbon is bent down at 11 to fit in a hole or cavity 12 in the topmost leaf 13 of a spring 14 composed of a plurality of superposed registering leaves. The metal ribbon is then wrapped spirally around such leaves, the various turns or convolutions 15 desirably not overlapping but lying side by side. After the required number of turns have been made, the end 16 of the ribbon is tucked under the next adjacent convolution, preferably beneath the spring, where it is out of sight. Obviously, the bent end 11 by residing in the recess 12 prevents the device from shifting lengthwise the leaves and the possibility of the unwinding of the ribbon is overcome by fastening its other end beneath the adjacent convolution.

If the spring is subsequently upholstered or incased in a suitable covering, such for example, as leather, a clip or retaining device of this kind efficiently lends itself to this purpose because of its thinness and absence of projections.

Figures 3, 4:
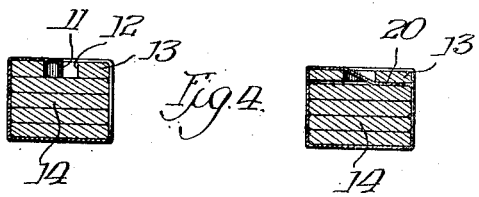
Fig. 3 is a section on line 3—3 of Fig. 2.
Fig. 4 is a view similar to Fig. 3 but of a modified construction.

In some instances it may be desirable to use a somewhat modified construction, as shown in Fig. 4. In this case the end 20 of the strip or ribbon is pushed through the hole 12 and beneath the upper spring, thus affording a somewhat more secure attachment or anchorage for the end. Otherwise the device is the same as that described above.

In both cases the thin sheet-metal ribbon clip is securely held in place, maintaining the leaves in register and restraining or limiting the spring rebound. Obviously, by reason of the construction the leaves are free to slide longitudinally on one another, but are, nevertheless, held efficiently against undesired displacement or shifting.

To those skilled in this art it will be clear that various minor mechanical changes may be incorporated in the constructions shown and described without departure from the substance of the invention and without the sacrifice of any of its substantial benefits and advantages. Stated somewhat differently, the invention is not limited and restricted to the precise and exact details of construction shown and described.

I claim:

1. In a leaf-spring construction of the character described, the combination of a spring structure composed of a plurality of superposed leaf-springs, and a clip therefor comprising a thin metal ribbon spirally wound around the leaves, substantially as described.

2. In a leaf-spring construction of the character described, the combination of a spring structure composed of a plurality of superposed leaf-springs, and a clip therefor comprising a thin sheet-metal ribbon spirally wound around the leaves, one end of the clip coöperating with said spring structure and constructed and arranged to prevent the clip from shifting lengthwise the leaves, and the other end of the clip constructed and arranged to prevent said end from unwinding, substantially as described.

3. In a leaf-spring construction of the character described, the combination of a spring structure composed of a plurality of superposed leaf-springs of which at least one has a recess, and a clip therefor comprising a thin sheet-metal ribbon spirally wound around the leaves, one end of the clip ribbon engaging in the recess in one of the leaves to prevent the clip from shifting lengthwise the leaf, substantially as described.

4. In a leaf-spring construction of the character described, the combination of a spring structure composed of a plurality of superposed leaf-springs, and a clip therefor comprising a thin sheet-metal ribbon spirally wound around the leaves, one end of the clip being fitted beneath an adjacent convolution of the clip to prevent such end from unwinding, substantially as described.

5. In a leaf-spring construction of the character described, the combination of a spring structure composed of a plurality of superposed leaf-springs of which at least one has a recess, and a clip therefor comprising a thin sheet-metal ribbon spirally wound around the leaves, one end of the clip ribbon engaging in the recess in one of the leaves to prevent the clip from shifting lengthwise the leaves, the other end of the clip ribbon being fitted beneath an adjacent convolution of the clip to prevent such end from unwinding, substantially as described.

6. In a leaf-spring construction of the character described, the combination of a spring structure composed of a plurality of superposed leaf-springs of which an outer one has a hole therethrough, and a clip for such spring structure comprising a thin sheet-metal ribbon spirally wound around the leaves, one end of such ribbon extending through said hole and interposed between such apertured outside leaf and the next inner one, substantially as described.

7. In a leaf-spring construction of the character described, the combination of a spring structure composed of a plurality of superposed leaf-springs of which an outer one has a hole therethrough, and a clip for such spring structure comprising a thin sheet-metal ribbon spirally wound around the leaves, one end of such ribbon extending through said hole and interposed between such apertured outside leaf and the next inner one, the other end of the clip ribbon being fitted beneath an adjacent convolution of the clip to prevent such end from unwinding, substantially as described.

IRA A. WEAVER.

Witnesses:
  F. M. ROGERSON,
  B. W. LAWLESS.

Copies of this patent may be obtained for five cents each, by addressing the "Commissioner of Patents, Washington, D. C."